United States Patent
Wyse et al.

(10) Patent No.: US 7,955,416 B2
(45) Date of Patent: Jun. 7, 2011

(54) POLYMERIZED POLYMERIC FLUID STORAGE AND PURIFICATION METHOD AND SYSTEM

(75) Inventors: Carrie L. Wyse, Longmont, CO (US); Robert Torres, Parker, CO (US); Andrew R. Millward, Longmont, CO (US)

(73) Assignee: Matheson Tri-Gas, Inc., Basking Ridge, NJ (US)

( * ) Notice: Subject to any disclaimer, the term of this patent is extended or adjusted under 35 U.S.C. 154(b) by 271 days.

(21) Appl. No.: 12/329,440

(22) Filed: Dec. 5, 2008

(65) Prior Publication Data
US 2010/0140175 A1 Jun. 10, 2010

(51) Int. Cl.
*B01D 53/04* (2006.01)
*B65D 81/00* (2006.01)

(52) U.S. Cl. .............................. 95/90; 95/900
(58) Field of Classification Search .............. 95/90, 149, 95/241, 900; 96/108, 155, 243; 210/660, 210/502.1; 222/1; 206/0.7
See application file for complete search history.

(56) References Cited

U.S. PATENT DOCUMENTS

| | | | |
|---|---|---|---|
| 4,603,148 A * | 7/1986 | Tom | 521/31 |
| 4,604,270 A | 8/1986 | Tom | |
| 4,659,552 A | 4/1987 | Tom | |
| 4,696,953 A | 9/1987 | Tom | |
| 4,716,181 A | 12/1987 | Tom | |
| 4,867,960 A | 9/1989 | Tom | |
| 5,648,508 A | 7/1997 | Yaghi | |
| 5,993,766 A * | 11/1999 | Tom et al. | 423/294 |
| 6,110,258 A | 8/2000 | Fraenkel | |
| 6,395,070 B1 | 5/2002 | Bhadha et al. | |
| 6,425,946 B1 | 7/2002 | Funke et al. | |
| 6,461,411 B1 | 10/2002 | Watanabe et al. | |
| 6,547,861 B2 | 4/2003 | Funke et al. | |
| 6,660,063 B2 * | 12/2003 | Tom et al. | 95/90 |
| 6,733,734 B2 | 5/2004 | Watanabe et al. | |
| 6,911,065 B2 * | 6/2005 | Watanabe et al. | 95/90 |
| 6,929,679 B2 * | 8/2005 | Muller et al. | 95/90 |
| 7,611,566 B2 * | 11/2009 | Arnold et al. | 95/114 |
| 2003/0192430 A1 * | 10/2003 | Pearlstein et al. | 95/90 |

(Continued)

FOREIGN PATENT DOCUMENTS
WO  WO 2006/026064 A2  3/2006

OTHER PUBLICATIONS

Huadong Tang, et al., Atom Transfer Radical Polymerization of Styrenic Ionic Liquid Monomers and Carbon Dioxide Absorption of the Polymerized Ionic Liquids, Journal of Polymer Science Part A, Polymer Chemistry 2005, vol. 43, No. 7, pp. 1432-1443.

(Continued)

Primary Examiner — Frank M Lawrence
(74) Attorney, Agent, or Firm — Kilpatrick Townsend & Stockton LLP

(57) ABSTRACT

A method of storing and dispensing a fluid includes providing a vessel configured for selective dispensing of the fluid therefrom. A polymerized polymeric material is provided within the vessel. The fluid is contacted with the polymerized polymeric material for take-up of the fluid by the polymerized polymeric material. The fluid is released from the polymerized polymeric material and dispensed from the vessel.

27 Claims, 4 Drawing Sheets

U.S. PATENT DOCUMENTS

| | | | | |
|---|---|---|---|---|
| 2006/0226073 A1* | 10/2006 | Wyse et al. | | 210/634 |
| 2007/0068389 A1* | 3/2007 | Yaghi | | 96/148 |
| 2007/0119302 A1* | 5/2007 | Radosz et al. | | 96/5 |
| 2007/0180998 A1* | 8/2007 | Arnold et al. | | 96/108 |
| 2007/0262025 A1* | 11/2007 | Krogue et al. | | 210/679 |
| 2008/0296305 A1* | 12/2008 | Wyse et al. | | 220/565 |

OTHER PUBLICATIONS

PCT International Search Report and Written Opinion mailed Jul. 26, 2010, International Application No. PCT/US2009/066633, 13 pages.

J. Tang et al., "Enhanced CO2 Absorption of Poly (ionic liquid)s", *Macromolecules* 38:2037-2039 (2005).

* cited by examiner

POLYMERIZED POLYMERIC FLUID STORAGE AND PURIFICATION METHOD AND SYSTEM

BACKGROUND OF THE INVENTION

1. Field of the Invention

The present invention relates to a method of storing, purifying and stabilizing a fluid, and more particularly to a vessel containing a polymerized polymeric material or combinations thereof.

2. Description of the State of the Art

Many industrial processes require a reliable source of process gases for a wide variety of applications. Often these gases are stored in cylinders or vessels and then delivered to the process under controlled conditions from the cylinder. For example, the silicon semiconductor manufacturing industry, as well as the compound semiconductor industry, uses a number of hazardous specialty gases such as diborane, stilbene, phosphine, arsine, boron trifluoride, hydrogen chloride, and tetrafluoromethane for doping, etching, thin-film deposition, and cleaning. These gases pose significant safety and environmental challenges due to their high toxicity and reactivity. Additionally, storage of hazardous gases under high pressure in metal cylinders is often unacceptable because of the possibility of developing a leak or catastrophic rupture of the cylinder, cylinder valve, or downstream component.

In order to mitigate some of these safety issues associated with high pressure cylinders, there is a need for a low pressure storage and delivery system. Additionally, some gases, such as diborane, tend to decompose when stored for a period of time. Thus, it would be useful to have a way to store unstable gases in a manner that reduces or eliminates the decomposition.

It is also desirable to have a method of removing impurities from gases, particularly in the semiconductor industry. The growth of high quality thin film electronic and optoelectronic cells by chemical vapor deposition or other vapor-based techniques is inhibited by a variety of low-level process impurities which are present in gas streams involved in semiconductor manufacturing or are contributed from various components such as piping, valves, mass flow controllers, filters, and similar components. These impurities can cause defects that reduce yields by increasing the number of rejects, which can be very expensive.

Chemical impurities may originate in the production of the source gas itself, as well as in its subsequent packaging, shipment, storage, handling, and gas distribution system. Although source gas manufacturers typically provide analyses of source gas materials delivered to the semiconductor manufacturing facility, the purity of the gases may change because of leakage into or outgassing of the containers, e.g. gas cylinders, in which the gases are packaged. Impurity contamination may also result from improper gas cylinder changes, leaks into downstream processing equipment, or outgassing of such downstream equipment. Source gases may include impurities, or impurities may occur as a result of decomposition of the stored gases. Impurities can also occur as a result of chemical reaction between the fluid and the surface of the vessel, the fluid and other impurities in the fluid, as well as between the fluid and impurities in the materials used in the construction of the vessel. Furthermore, the impurity levels within the gas container may increase with length of storage time and can also change as the container is consumed by the end user. Thus, there remains a need for a low pressure and delivery device that is also able to remove contaminants from gases, particularly to very low levels.

BRIEF SUMMARY OF THE INVENTION

In one aspect of the invention, a method of storing and dispensing a fluid is provided. The method includes providing a vessel having a polymerized polymeric material within configured for maximized storage and stabilization of a fluid contained therein. The fluid when introduced into the vessel is contacted with the polymerized polymeric material for take-up of the fluid by the polymerized polymeric material.

The polymerized polymeric materials for use in the present invention are substances composed of molecules which have long sequences of one or more species of atoms or groups of atoms linked to each other by primary, usually covalent, bonds. Polymerized polymeric materials include, but are not limited to, the following three classes of polymeric materials: (i) inorganic polymers, such as but not limited to, zeolites, clays, oxides, nitrides, metal halides, minerals, xerogels, aerogels, metal oxides and alloys derived from inorganic polymeric gels; (ii) organic polymers, such as but not limited to, protein, porous carbons, carbon nanotubes, fullerenes, "polymers", ionic liquid polymers, fullerene polymers, supramolecular polymers, polymerized zwitterions, covalent organic frameworks, dendrimers, nucleic acids, carbohydrates, polyphosphazines, and (iii) hybrid polymers, such as but not limited to, metal-organic frameworks, coordination polymers, silicones, silsesquioxanes, and ionic liquid polymers with metal containing anions. Polymerized polymeric materials also include the materials resulting from additional physical or chemical treatment of the polymerized polymeric materials listed above. Physical and chemical treatments include but are not limited to thermal processing, sintering, dehydration, oxidation, reduction, passivation, activation, and pickling. Thus, polymerized polymeric materials include sol-gel derived oxides and metal alloys and their sponge-like forms derived from thermal processing of sol-gels. Sol-gel processes include those involving classic metal-oxo gels, as well as polymeric inorganic hydrogels also known as cyanogels.

In another aspect of the invention, a method of separating an impurity from a fluid mixture is provided. A fluid mixture comprising both the fluid as well as an impurity is introduced into a vessel having a polymerized polymeric material wherein the fluid mixture is contacted with the polymerized polymeric material. Upon dispensing the fluid from the vessel a portion of the impurity is retained within the polymerized polymeric material to produce a purified fluid.

In another aspect of the invention, a method of stabilizing an unstable fluid is provided. The method includes providing a vessel containing a polymerized polymeric material. The unstable fluid is contacted with the polymerized polymeric material for take-up of the unstable fluid by the polymerized polymeric material. The unstable fluid is then stored within the polymerized polymeric material for a period of time, during which period of time there is substantially reduced decomposition of the unstable fluid. The unstable fluid may be selected from digermane, disilane, hydrogen selenide, borane, diborane, stilbene, nitric oxide, organometallics, and halogenated oxy-hydrocarbons.

The foregoing paragraphs have been provided by way of general introduction, and are not intended to limit the scope of the following claims. The presently preferred embodiments, together with further advantages, will be best understood by reference to the following detailed description taken in conjunction with the accompanying drawings.

BRIEF DESCRIPTION OF THE DRAWINGS

The accompanying drawings, which are incorporated in and form a part of the specifications, illustrate the preferred embodiments of the present invention, and together with the description serve to explain the principles of the invention.

In the Drawings.

DETAILED DESCRIPTION OF THE INVENTION

Figure 1:
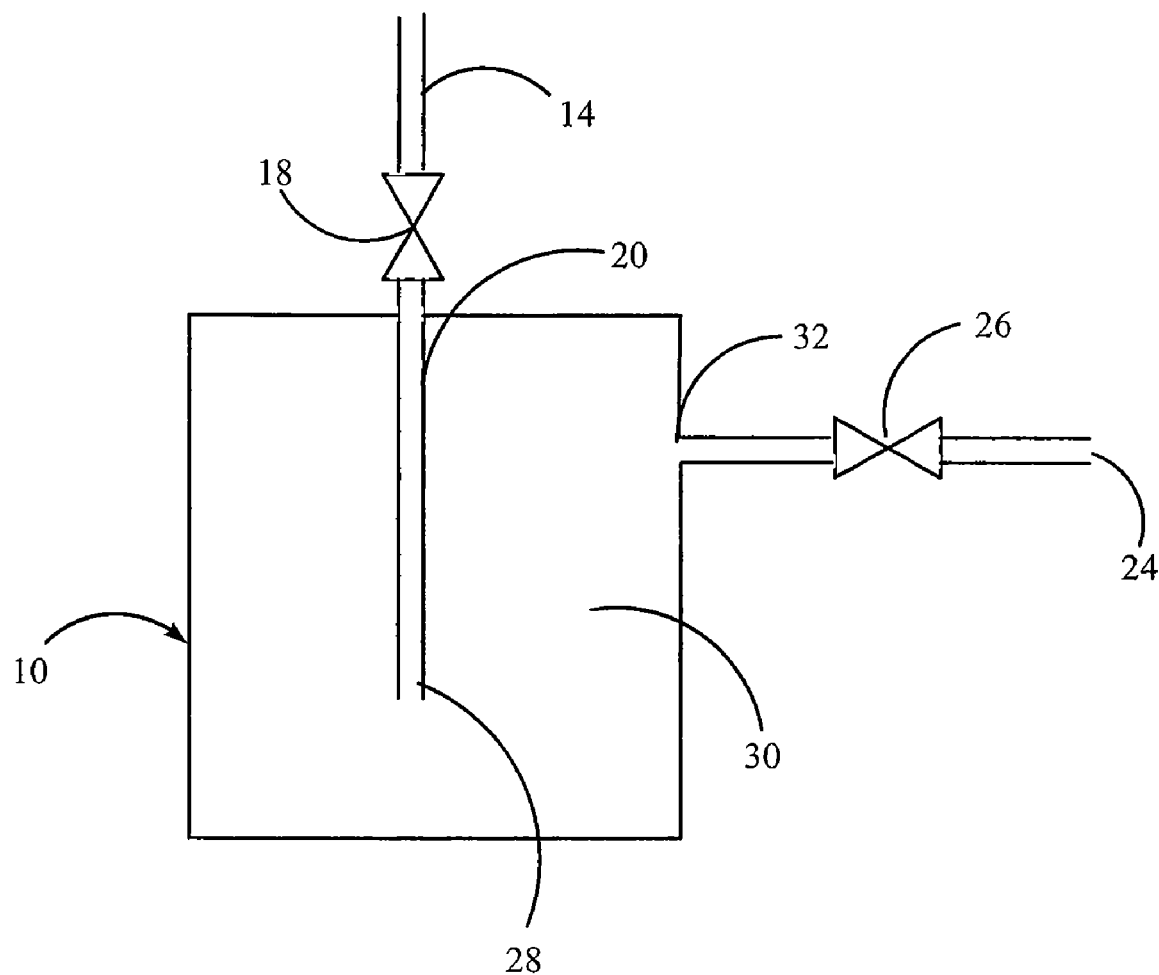
FIG. 1 shows an embodiment of a vessel for storing a fluid in a polymerized polymeric material.

The present invention is directed to the use of a polymerized polymeric material or combinations thereof to store a fluid material such as a gas or liquid, purify a fluid material, and stabilize a fluid material. A vessel is configured for the selective dispensing of the fluid and contains a polymerized polymeric material or combinations thereof. The polymerized polymeric material can be prepared in-situ, allowing the material to conform to the shape of the vessel, or ex-situ and transferred into the vessel. The fluid is contacted with the polymerized polymeric materials for take-up of the fluid by the polymerized polymeric materials. This allows storage of the fluid for a period of time. In one embodiment, the material in the storage vessel is at high pressure, for example up to about 4000 psi, preferably up to at least about 2000 psi. In another embodiment, the pressure of the material in the storage vessel is at around atmospheric pressure, which allows for safer storage conditions compared to high-pressure storage vessels.

The polymerized polymeric materials may also be used to stabilize unstable fluids, such as diborane, or calibration standards of carbonyl sulfide which tend to decompose. Contact of the unstable fluid with the polymerized polymeric materials can reduce or eliminate the decomposition and or reaction of the unstable fluids.

The present invention is also directed to the use of polymerized polymeric materials to remove impurities from a fluid mixture. A vessel contains a polymerized polymeric material or combination thereof and is configured for contacting the polymerized polymeric material with the fluid mixture. The fluid mixture is introduced into the vessel and the fluid mixture is contacted with the polymerized polymeric material. A portion of the impurities are retained within the polymerized polymeric materials to produce a purified fluid. This purification method may be combined with the previously described storage method, stabilization method, as well as the storage and stabilization methods combined.

Polymerized polymeric materials offer such physical properties as extremely low vapor pressure, high thermal stability, high porosity, and high surface area. They also offer the ability to conform to the shape of the container when prepared in-situ, thereby offering a vessel that is optimally filled. The polymerized polymeric materials for use in the present invention are substances composed of molecules which have long sequences of one or more species of atoms or groups of atoms linked to each other by primary, usually covalent, bonds. In one embodiment, the polymeric materials are preferably polymerized inside the vessel for optimal filling capacity. In another embodiment the polymeric materials are polymerized ex-situ and subsequently transferred into the vessel for further processing. The polymerized polymeric materials of the present invention include, but are not limited to, the following three classes of polymeric materials: (i) inorganic polymers, such as but not limited to, zeolites, clays, layered oxide materials, aluminophosphates, germanates, aluminosilicates, germanium phosphates, oxides, nitrides, metal halides, minerals, gels, xerogels, aerogels, metal oxides and alloys derived from inorganic polymeric gels sintered glass and other forms and types of generally non-organic materials; (ii) organic polymers, such as but not limited to, proteins (from both natural and synthetic amino acids), porous carbons, carbon nanotubes, fullerenes, fullerene polymers, supramolecular polymers, covalent organic frameworks (COFs), dendrimers, nucleic acids (DNA, RNA), carbohydrates, polyphosphazines, ionic liquid polymers, polymerized zwitterions, and traditional polymers, and (iii) hybrid polymers, such as but not limited to, metal-organic frameworks, coordination polymers, silicones, silsesquioxanes, and ionic liquid polymers with metal containing anions.

Conventional long-chain hydrocarbon-based polymers include but are not limited to the general types including linear or branched polymers, homopolymers and copolymers, including thermoplastics, thermosets ("tightly" cross-linked chains) and elastomers ("loosely" cross-linked chains) which are characterized by their degree of polymerization, degree of copolymerization, molar mass distribution, crystallinity, glass transition temperature, melting point, degree of branching, tacticity, viscosity, elasticity, end groups and cross-links. Polymers also include but are not limited to polymerized ionic liquids. Polymerized ionic liquids can be formed from the polymerization at a cation, polymerization at an anion, polymerization at a cation of one precursor and an anion of another, as well as polymerized zwitterions, in which both cation and anion are tethered with a covalent bond.

Variation of copolymerization including types of copolymer, terpolymer (and higher orders of mixing), random, alternating or block copolymerization, graft copolymer (containing side chains), and inclusion of plasticizer.

Mechanisms of polymerization including step-growth (condensation), chain-growth (addition), and ring-opening, with specific examples of step-growth reactions including but not limited to esters, amides, urethanes, carbonates and siloxanes; with specific examples of chain-growth reactions including but not limited to ethylenes, styrenes, vinyls, acrylics, vinylidene chlorides, methyl methacrylate, isobutylene, tetrafluoroethylene, ethylene oxide and eta-caprolactam; with specific examples of ring-opening reactions including but not limited to epoxies, lactones, lactams, cyclic formals, cyclic sulfides, alkylenimenes, cyclic acetals, cyclic siloxanes. Polymerization of the ionic liquids can be via free radical polymerization, atom transfer radical polymerization, or other mechanisms detailed above. Polymerization of the polymeric materials can take place ex-situ or in-situ. The polymerized polymeric materials can also be further processed chemically or physically in preparation for fluid processing.

Specific formation methods of polyesters including but not limited to esterification of hydroxycarboxylic acids, esterification of a diacid and a diol, ester interchange with alcohols, ester interchange with esters, esterification of acid chlorides, lactone polymerization; specific polyamide formation methods including but not limited to amidation of amino acids, amidation of a diacid and a diamine, interchange reactions, amidation of acid chlorides.

Other variable characteristics of the polymers including positional isomerism, stereo isomerism (isotactic, syndiotactic, atactic) and geometrical isomerism.

Initiation methods including but not limited to radical, thermal, pH, electromagnetic radiation (UV, gamma ray, etc), peroxide, azo compounds, and redox systems.

Other polymeric materials for use in the present invention, include polymers bearing functional groups including but not limited to acyl halide, alcohol, aldehyde, alkane, alkene, alkyne, amide, amine, azo compound, benzyl, carbonate, carboxylate, carboxylic acid, cyanates, ether, ester, haloalkane, imine, isocyanide, isocyanate, isothiocyanate, ketone, nitrate, nitrile, nitrite, nitro, nitroso, peroxide, phenyl, phosphazine, phosphine, phosphodiester, phosphone, phosphate, pyridine, sulfide, sulfone, sulfoxide, thiol.

Specific polymers including but not limited to Acrylonitrile butadiene styrene (ABS), Acrylic, Celluloid, Cellulose acetate, Ethylene-Vinyl Acetate (EVA), Ethylene vinyl alcohol (EVAL), Fluoroplastics (PTFEs, including FEP, PFA, CTFE, ECTFE, ETFE), Ionomers, Kydex, a trademarked acrylic/PVC alloy, Liquid Crystal Polymer (LCP), Polyacetal (POM or Acetal), Polyacrylates (Acrylic), Polyacrylonitrile (PAN or Acrylonitrile), Polyamide (PA or Nylon), Polyamide-imide (PAI), Polyaryletherketone (PAEK or Ketone), Polybutadiene (PBD), Polybutylene (PB), Polybutylene terephthalate (PBT), Polyethylene terephthalate (PET), Polycyclohexylene dimethylene terephthalate (PCT), Polycarbonate (PC), Polyhydroxyalkanoates (PHAs), Polyketone (PK), Polyester, Polyethylene (PE), Polyetheretherketone (PEEK), Polyetherimide (PEI), Polyethersulfone (PES), Polyethylenechlorinates (PEC), Polyimide (PI), Polylactic acid (PLA), Polymethylpentene (PMP), Polyphenylene oxide (PPO), Polyphenylene sulfide (PPS), Polyphthalamide (PPA), Polypropylene (PP), Polystyrene (PS), Polysulfone (PSU), Polyvinyl chloride (PVC), Spectralon; Natural Rubber (NR), Polyisoprene (IR), Butyl rubber (copolymer of isobutylene and isoprene, IIR), Halogenated butyl rubbers (Chloro Butyl Rubber: CIIR; Bromo Butyl Rubber: BIIR), Polybutadiene (BR), Styrene-butadiene Rubber (copolymer of polystyrene and polybutadiene, SBR), Nitrile Rubber (copolymer of polybutadiene and acrylonitrile, NBR), also called buna N rubbers, Hydrated Nitrile Rubbers (HNBR) Therban® and Zetpol®, Chloroprene Rubber (CR), polychloroprene, Neoprene, Baypren; Ethylene propylene rubber (EPM), ethylene propylene diene rubber (EPDM), Epichlorohydrin rubber (ECO), Polyacrylic rubber (ACM, ABR), Silicone rubber (SI, Q, VMQ), Fluorosilicone Rubber (FVMQ), Fluoroelastomers (FKM, FPM) Viton®, Tecnoflon®, Fluorel® and Dai-El®, Perfluoroelastomers (FFKM), Tetrafluoro ethylene/propylene rubbers (FEPM), Chlorosulfonated Polyethylene (CSM), (Hypalon®), Ethylene-vinyl acetate (EVA).

Examples of further organic polymeric materials include carbohydrates including but not limited to starches (amylose, amylopectins), glycogen, cellulose, lignin, chitin, callose, laminarin, galactomannan, etc. Proteins including but not limited to collagen, keratin. Bulk carbon materials including porous carbons, microporous carbons, nanoporous carbons, mesoporous carbons, sintered carbons, fullerenes, and organically functionalized carbons.

By way of example, but not to limit the scope of polymeric materials that are contemplated for use in the present invention, a variety of ionic liquids can be polymerized for use in the present invention by chemically functionalizing the rudimentary ionic liquid with a polymerizable moiety as listed above to generate a monomeric ionic liquid which can then be polymerized. Additionally, two or more ionic liquid polymers may be combined for use in any of the aspects of the present invention. In one embodiment, the ionic liquid polymers that are contemplated for use include but are not limited to the polymeric forms of mono-substituted imidazolium salts, di-substituted imidazolium salts, tri-substituted imidazolium salts, pyridinium salts, pyrrolidinium salts, phosphonium salts, ammonium salts, tetralkylammonium salts, guanidinium salts, isouronium salts, and mixtures thereof. In this context, the listed salts include any compound that contains the listed cation. In one embodiment, the ionic liquid includes a cation component selected from mono-substituted imidazoliums, di-substituted imidazoliums, tri-substituted imidazoliums, pyridiniums, pyrrolidiniums, phosphoniums, ammoniums, tetralkylammoniums, guanidiniums, and uroniums; and an anion component selected from acetate, cyanates, alkanoates, halogenides, sulfates, sulfonates, amides, imides, methanes, borates, phosphates, antimonates, tetrachoroaluminate, thiocyanate, tosylate, carboxylate, cobalt-tetracarbonyl, trifluoroacetate and tris(trifluoromethylsulfonyl)methide. Halogenide anions include fluoride, chloride, bromide, iodide. Sulfates and sulfonate anions include but are not limited to methyl sulfate, ethyl sulfate, butyl sulfate, hexyl sulfate, octyl sulfate, hydrogen sulfate, methane sulfonate, dodecylbenzene sulfonate, dimethyleneglycolmonomethylether sulfate, trifluoromethane sulfonate. Amides, imides, and methane anions include but are not limited to dicyanamide, bis(pentafluoroethylsulfonyl)imide, bis(trifluoromethylsulfonyl)imide, bis(trifluoromethyl)imide. Borate anions include but are not limited to tetrafluoroborate, tetracyanoborate, bis[oxalato(2-)]borate, bis[1,2-benzenediolato(2-)-O, O']borate, bis[salicylato(2-)]borate. Phosphate and phosphinate anions include but are not limited to hexafluorophosphate, diethylphosphate, bis(pentafluoroethyl)phosphinate, tris(pentafluoroethyl)trifluorophosphate, tris (nonafluorobutyl)trifluorophosphate. Anitmonate anions include hexafluoroantimonate. Other anions include but are not limited to tetrachoroaluminate, acetate, thiocyanate, tosylate, carboxylate, cobalt-tetracarbonyl, trifluoroacetate and tris(trifluoromethylsulfonyl)methide.

Another way the preferred ionic liquids in the present invention may be categorized is by functional group of the cation. This includes but is not limited to the following categories: mono-substituted imidazoliums, di-substituted imidazoliums, tri-substituted imidazoliums, pyridiniums, pyrrolidiniums, phosphoniums, ammoniums, tetralkylammoniums, guanidiniums, and uroniums. Mono-substituted imidazolium ionic liquids include 1-methylimidazolium tosylate, 1-methylimidazolium tetrafluoroborate, 1-methylimidazolium hexafluorophosphate, 1-methylimidazolium trifluoromethanesulfonate, 1-butylimidazolium tosylate, 1-butylimidazolium tetrafluoroborate, 1-methylimidazolium hexafluorophosphate, 1-methylimidazolium trifluoromethanesulfonate.

Di-substituted imidazolium ionic liquids include 1,3-dimethylimidiazolium methylsulfate, 1,3-dimethylimidiazolium trifluoromethanesulfonate, 1,3-dimethylimidiazolium bis (pentafluoroethyl)phosphinate, 1-ethyl-3-methylimidiazolium thiocyanate, 1-ethyl-3-methylimidiazolium dicyanamide, 1-ethyl-3-methylimidiazolium cobalt-tetracarbonyl, 1-propyl-3-methylimidazolium chloride, 1-butyl-3-methylimidazolium hexafluoroantimonate, 1-octadecyl-3-methylimidazolium bis(trifluoromethylsulfonyl)imide, 1-benzyl-3-methylimidazolium bromide, 1-phenylpropyl-3-methylimidazolium chloride.

Tri-substituted imidazolium ionic liquids include 1-ethyl-2,3-dimethylimidazolium chloride, 1-butyl-2,3-dimethylimidazolium octylsulfate, 1-propyl-2,3-dimethylimidazolium chloride, 1-hexyl-2,3-dimethylimidazolium tetrafluoroborate, 1-hexadecyl-2,3-dimethylimidazolium iodide. Pyridinium ionic liquids include n-ethylpyridinium chloride, n-butylpyridinium bromide, n-hexylpyridinium n-octylpyridinium chloride, 3-methyl-n-butylpyridinium methylsulfate, 3-ethyl-n-butylpyridinium hexafluorophosphate, 4-methyl-n-butylpyridinium bromide, 3,4-dimethyl-n-butylpyridinium chloride, 3,5-dimethyl-n-butylpyridinium chloride.

Pyrrolidinium ionic liquids include 1,1-dimethylpyrrolidinium tris(pentafluoroethyl)trifluorophosphate, 1-ethyl-1-methylpyrrolidinium dicyanamide, 1,1-dipropylpyrrolidinium bis(trifluoromethylsulfonyl)imide, 1-butyl-1-methylpyrrolidinium bromide, 1-butyl-1-ethylpyrrolidinium bromide, 1-octyl-1-methylpyrrolidinium dicyanamide.

Phosphonium ionic liquids include tetraoctylphosphonium bromide, tetrabutylphosphonium bis[oxalato(2-)]-borate, trihexyl(tetradecyl)phosphonium dicyanamide, benzyltriphenylphosphonium bis(trifluoromethyl)imide, tri-iso-butyl (methyl)phosphonium tosylate, ethyl(tributyl)phosphonium diethylphosphate, tributyl(hexadecyl)phosphonium chloride.

Ammonium ionic liquids include tetramethylammonium bis(trifluoromethylsulfonyl)imide, tetraethylammonium bis-[salicylato-(2-)]-borate, tetrabutylammonium tetracyanoborate, methyltrioctylammonium trifluoroacetate.

Guanidinium ionic liquids include N,N,N',N',N''-pentamethyl-N''-isopropylguanidinium tris(pentafluoroethyl)trifluorophosphate, N,N,N',N',N''-pentamethyl-N''-isopropylguanidinium tris(pentafluoroethyl)trifluoromethanesulfonate, hexamethylguanidinium tris(pentafluoroethyl)trifluorophosphate, hexamethylguanidinium trifluoromethanesulfonate.

Uronium ionic liquids include S-methyl-N,N,N',N'-tetramethylisouronium trifluoromethanesulfonate, O-methyl-N,N,N',N'-tetramethylisouronium tris(pentafluoroethyl)trifluorophosphate, O-ethyl-N,N,N',N'-tetramethylisouronium tris(pentafluoroethyl)trifluorophosphate, S-ethyl-N,N,N',N'-tetramethylisouronium trifluoromethanesulfonate, S-ethyl-N,N,N',N'-tetramethylisothiouronium trifluoromethanesulfonate.

Generally, ionic liquids consist of a bulky, asymmetric cation and an inorganic anion. The bulky, asymmetric nature of the cation prevents tight packing, which decreases the melting point. Due to the wide variety of cations and anions possible for such ion pairs, a wide range of gas solubilities is conceivable, for a variety of inorganic and organic materials. The physical properties of ionic liquids can include good dissolution properties for most organic and inorganic compounds; high thermal stability; non-flammability; negligible vapor pressure; low viscosity, compared to other ionic materials; and recyclability.

The wide range of chemical functionalities available with ionic liquids offers possibilities for gas delivery and control. For example, polymerized polymeric materials prepared from ionic liquid precursors may provide the capability to control the release of a gas and/or its impurities via solubility control with temperature or pressure. This may enable the storage of a gas and its impurities, while selectively releasing only the desired gas by changing certain parameters, such as temperature or pressure, leaving the impurities behind. Thus there is potential for a polymerized polymeric materials system that could function as a 2-in-1 system, providing both storage and purification in one container.

Specific ionic liquid polymers include but are not limited to poly[1-(4-vinylbenzyl)-3-butyl imidazolium tetrafluoroborate] (PVBIT), poly[1-(4-vinylbenzyl)-3-butyl imidazolium hexafluorophosphate] (PVBIH) and poly[2-(1-butylimidazolium-3-yl)ethyl methacrylate tetrafluoroborate] (PBIMT), J. Tang et al., *Macromolecules* 38:2037-2039 (2005).

Hybrid organic/inorganic materials including but not limited to metal-organic frameworks, microporous metal-organic materials, metallo-organic materials, organometallic frameworks, coordination polymers, self-assembled materials, silicones, silsesquioxanes and covalent-organic frameworks. Metal-organic frameworks comprised of single metal atom nodes or metal clusters, one single type of metal atom or a mixture of metal atoms. A sample list of metal atoms includes $Li^+$, $Na^+$, $K^+$, $Rb^+$, $Be^{2+}$, $Mg^{2+}$, $Ca^{2+}$, $Sr^{2+}$, $Ba^{2+}$, $Sc^{3+}$, $Y^{3+}$, $Ti^{4+}$, $Zr^{4+}$, $Hf^{4+}$, $V^{4+}$, $V2^+$, $Nb^{3+}$, $Ta^{3+}$, $Cr^{3+}$, $Mo^{3+}$, $W^{3+}$, $Mn^{3+}$, $Mn^{2+}$, $Re^{3+}$, $Re^{2+}$, $Fe^{3+}$, $Fe^{2+}$, $Ru^{3+}$, $Ru^{2+}$, $Os^{3+}$, $Os^{2+}$, $Co^{3+}$, $Co^{2+}$, $Rh^{2+}$, $Rh^+$, $Ir^{2+}$, $Ir^+$, $Ni^{2+}$, $Ni^+$, $Pd^{2+}$, $Pd^+$, $Pt^{2+}$, $Pt^+$, $Cu^{2+}$, $Cu^+$, $Ag^+$, $Au^+$, $Zn^{2+}$, $Cd^{2+}$, $Hg^{2+}$, $Al^{3+}$, $Ga^{3+}$, $In^{3+}$, $Tl^{3+}$, $Si^{4+}$, $Si^{2+}$, $Ge^{4+}$, $Ge^{2+}$, $Sn^{4+}$, $Sn^{2+}$, $Pb^{4+}$, $Pb^{2+}$, $As^{5+}$, $As^{3+}$, $As^+$, $Sb^{5+}$, $Sb^{3+}$, $Sb^+$, $Bi^{5+}$, $Bi^{3+}$, $Bi^+$, or any combination thereof.

Metal-organic frameworks comprised of multi-dentate linking units which coordinate or chelate or bind the metal centers or metal clusters, and space them apart resulting in pores within the medium, as described in U.S. Pat. No. 5,648,508 which is incorporated herein, in its entirety, by reference. The framework may be adorned by other moieties be they adsorbed chemical species, guest species, or space-filling agents. The framework can also contain non-linking ligands which may or may not be necessary to charge-balance the framework, some examples of which are $O_2$, sulfate, nitrate, nitrite, sulfite, bisulfite, phosphate, hydrogen phosphate, dihydrogen phosphate, diphosphate, triphosphate, phosphite, chloride, chlorate, bromide, bromate, iodide, iodate, carbonate, bicarbonate, sulfide, hydrogen sulphate, selenide, selenate, hydrogen selenate, telluride, tellurate, hydrogen tellurate, nitride, phosphide, arsenide, arsenate, hydrogen arsenate, dihydrogen arsenate, antimonide, antimonate, hydrogen antimonate, dihydrogen antimonate, fluoride, boride, borate, hydrogen borate, perchlorate, chlorite, hypochlorite, perbromate, bromite, hypobromite, periodate, iodite, hypoiodite; and combinations thereof.

Other non-linking ligands that may be found in the framework include ammonia, carbon dioxide, methane, oxygen, argon, nitrogen, ethylene, hexane, benzene, toluene, xylene, chlorobenzene, nitrobenzene, naphthalene, thiophene, pyridine, acetone, 1,2-dichloroethane, methylenechloride, tetrahydrofuran, ethanolamine, triethylamine, trifluoromethylsulfonic acid, N,Ndimethyl formamide, N,N-diethyl formamide, dimethylsulfoxide, chloroform, bromoform, dibromomethane, iodoform, diiodomethane, halogenated organic solvents, N,N-dimethylacetamide, N,N-diethylacetamide, 1-methyl-2-pyrrolidinone, amide solvents, methylpyridine and dimethylpyridine.

Ionic liquids can have a stabilizing effect on intermediate reaction species in organic synthesis and catalysis, thus, polymerized polymeric materials from ionic liquid precursors may also offer stabilizing effects for unstable gas molecules. Utilization with even a small amount of polymerized polymeric materials may reduce or eliminate the decomposition of the unstable fluids. Storage of a gas or other fluid in a polymerized polymeric material may also be combined with the previously mentioned purification system to provide a 3-in-1 storage, stabilization, and purification system.

The mechanism for the dissolution of a fluid within polymerized polymeric materials is believed to be due to intermolecular forces. While not intending to be bound by any particular theory, possible factors that influence the solubility include hydrogen bonding, dielectric constant, dipole moment (polarizability), pi-pi interaction, length of carbon chain, number of carbon double bonds, the purity of the polymerized polymeric materials, chirality, and steric hindrance. It is not believed that the fluids chemically react with the polymerized polymeric materials; rather, it is believed that the fluids are simply solvated in the polymerized polymeric materials without the breaking of bonds. The breaking of bonds in either the polymerized polymeric materials or the fluids being stored therein would change the chemical and physical properties of the polymerized polymeric materials or fluids and could cause the new species to be considered a new impurity. It is the intention of this invention to store the fluid of interest in polymerized polymeric materials wherein the fluid molecules remain intact and are removed from the polymerized polymeric materials with the same molecular structure as they were introduced into the polymerized polymeric materials.

The solubility of a gas in a polymerized polymeric material varies with physical parameters such as temperature and pressure. However, it is also evident that the gas solubilities obtained depend on the polymerized polymeric materials used, particularly the anion and cation used. While not intending to be bound by any particular theory, the current understanding is that the anion has a strong influence on gas solubility. Specifically, the more interaction between the anion, the more dissolution appears to occur. The cation seems to be of secondary influence. Thus, several properties of the anion, the cation, and the dissolved gas play a role in these interactions. In addition, mixtures of different polymerized polymeric materials could result in unexpected high solubilities of various fluids.

The purity of a polymerized polymeric material is also believed to have an impact on their behavior. Polymerized polymeric materials which have been dried or baked, thus leaving them substantially anhydrous, may exhibit greater increased capacity for taking up fluid components. In addition, the presence of water or other impurities may decrease the solubility of certain fluid components, especially those gas components that are hydrophobic.

The polymerized polymeric material can also be further processed in order to activate the material for the desired interaction with the fluid. This includes physical and chemical treatment of the polymerized polymeric material, such as. thermal processing, sintering, dehydration, oxidation, reduction, chemical passivation, and pickling.

The method of storing and dispensing a fluid includes providing a vessel. One embodiment of a vessel 10 is shown in FIG. 1. The vessel 10 includes a fluid inlet 20, a polymerized polymeric material 30, and a fluid outlet 32. The fluid inlet 20 is connected to a fluid source 14 which is controlled by a valve 18. The polymerized polymeric material 30 is placed within vessel 10 prior to being welded shut. Alternatively, the polymerized polymeric material 30 may be formed in-situ by introducing the polymeric material precursors into vessel 10 and then polymerizing the polymeric material precursors within the vessel to form the polymerized polymeric material 30. The fluid outlet 32 is controlled by valve 26. The vessel is configured for selective dispensing of the fluid therefrom. The vessel is charged with a polymerized polymeric material 30. A vacuum bake procedure may be conducted on the vessel 10 to remove contaminants or other impurities from the polymerized polymeric material 30, preferably by pulling a vacuum while heating. This is done in order to remove any trace moisture and/or other volatile impurities from the polymerized polymeric material 30 and the fluid distribution components. The polymerized polymeric material 30 is allowed to cool to the desired operating temperature.

The source fluid is then introduced into the vessel 10 until the desired take-up or dissolution of the fluid by the polymerized polymeric material 30 is complete. The fluid may be a gas or a liquid such as a liquefied gas. The fluid is contacted with the polymerized polymeric material 30 for take-up of the fluid by the polymerized polymeric material 30. There is substantially no chemical change in the polymerized polymeric material 30 and the fluid. By "substantially no chemical change" is meant that no substantial amount of bonds in the fluid and the polymerized polymeric material 30 are being broken, such that the fluid and the polymerized polymeric material 30 retain their chemical identity. It is undesirable for the fluid to react with the polymerized polymeric material 30 to any significant effect. A reaction between the fluid and the polymerized polymeric material 30 would be expected to generate impurities or consume the fluid of interest.

The fluid may be introduced at any suitable pressure. In one embodiment, the fluid is a gas at a pressure of about 5 psi. In another embodiment, the gas is introduced at a pressure of at least about 100 psi, preferably up to about 2000 psi. In one embodiment, the gas is introduced until the inlet and outlet concentrations are equivalent, indicating the polymerized polymeric material 30 is saturated and cannot accept any further gas under the existing conditions. At this time, the source gas flow is stopped.

In one embodiment, contacting the fluid with the polymerized polymeric material 30 comprises flowing the fluid mixture through the polymerized polymeric material 30, as shown in FIG. 1. The vessel 10 is charged with a fluid through inlet 28 and through dip tube 20, from whence it flows through polymerized polymeric material 30.

Figure 2:
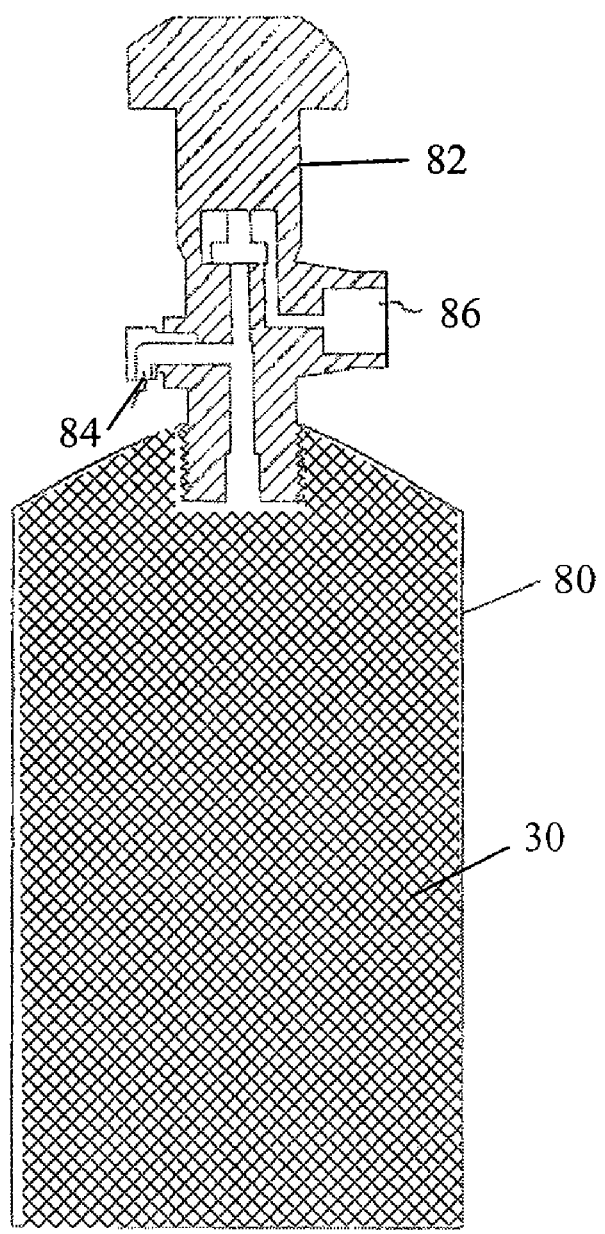
FIG. 2 shows another embodiment of a device for storing a fluid in a polymerized polymeric material.

In another embodiment, the fluid is first introduced and then the vessel is mechanically agitated in order to contact the fluid with the polymerized polymeric material 30. FIG. 2 shows an embodiment of a vessel 80 for storing a fluid in a polymerized polymeric material 30. The polymerized polymeric material 30 is prepared in-situ, or ex-situ and put into the vessel before valve assembly 82 is inserted into the vessel 80. The fluid is then added to the vessel 80 containing the polymerized polymeric material 30 in the conventional fashion through inlet port 84 in valve assembly 82 and allowed to diffuse. The fluid may be removed through outlet port 86.

In one embodiment, the fluid is a liquid. The vessel 80 shown in FIG. 2 may also be used to store a liquid in the polymerized polymeric material 30. The polymerized polymeric material 30 is prepared in-situ, or ex-situ and put into the vessel before valve assembly 82 is inserted into the vessel 80. The liquid is then added to the vessel 80 in the conventional fashion through inlet port 84 in valve assembly 82 and allowed to diffuse. The liquid may be removed through outlet port 86.

The fluid stored within the polymerized polymeric material 30 may be removed from the polymerized polymeric material 30 by any suitable method. The fluid is released from the polymerized polymeric material 30 in a substantially unreacted state. Pressure-mediated and thermally-mediated methods and purging, alone or in combination, are preferred. In pressure-mediated evolution, a pressure gradient is established to cause the gas to evolve from the polymerized polymeric material 30. In one embodiment, the pressure gradient is in the range of about atmospheric pressure to about 4000 psig. In a more preferred embodiment, the pressure gradient is typically in the range from $10^{-7}$ to 600 Torr at 25° C. For example, the pressure gradient may be established between the polymerized polymeric material 30 in the vessel, and the exterior environment of the vessel, causing the fluid to flow from the vessel to the exterior environment. The pressure conditions may involve the imposition on the polymerized polymeric material 30 of vacuum or suction conditions which effect extraction of the gas from the vessel.

In thermally-mediated evolution, the polymerized polymeric material 30 is heated to cause the evolution of the gas from the polymerized polymeric material 30 so that the gas can be withdrawn or discharged from the vessel. Typically, the temperature of the polymerized polymeric material 30 for thermal-mediated evolution ranges from −50° C. to 200° C., more preferably from 30° C. to 150° C. In one embodiment, the vessel containing the fluid and the polymerized polymeric material 30 is transported warm (i.e., around room temperature), then cooled when it is stored or used at the end user's site. In this manner, the fluid vapor pressure can be reduced at the end user's site and therefore reduce the risk of release of the gas from the vessel. Once the vessel is secured in a suitable location, the vessel can be chilled and the temperature can be controlled in such a manner as to limit the amount of gas pressure that is present in the container and piping. As the contents of the cylinder or other gas storage device are consumed, the temperature of the cylinder can be elevated to liberate the gas from the polymerized polymeric material 30 and to maintain the necessary amount of gas levels in the cylinder and piping. Thermally-mediated evolution can be combined with pressure-mediated evolution to deliver the fluid from the vessel.

The vessel may also be purged with a secondary gas, in order to deliver the stored primary gas. In purging, a secondary gas is introduced into the vessel in order to force the primary gas out of the polymerized polymeric material 30 and out of the storage container. Purging of a container can take place wherein the secondary gas is selected from a group of gases that has relatively low affinity for the polymerized polymeric material 30. The secondary gas is introduced into the polymerized polymeric material 30 in a manner wherein the secondary gas flows through the polymerized polymeric material 30 and causes the primary gas to be removed from the polymerized polymeric materials. The resultant gas mixture of primary gas and secondary gas then exit the gas storage container and are delivered to a downstream component in the gas distribution system. The purging configuration should be selected such that the maximum amount of usable primary gas is removed from the polymerized polymeric material 30. This includes selection of the appropriate geometry of the vessel such that the secondary gas has an enhanced pathway for the interaction or contact between the secondary fluid and the polymerized polymeric material 30. In practice, this could be use of a long and narrow storage container wherein the secondary fluid is introduced at the bottom of the container and the outlet of the container is near the top.

In an additional embodiment wherein the polymerized polymeric material 30 contains a liquid a device such as a diffuser can be used within the storage container that causes the bubbles of the secondary gas to be very small and numerous. In this manner, the surface area or contact area of the bubbles of the secondary gas is enhanced with the polymerized polymeric material 30.

Finally, the parameters of temperature and pressure within the purging storage container can be adjusted such that the desired concentration of the secondary gas and primary gas are constant and fall within a desired range. In this example, the vessel can be a separate container from the typical storage container such as a gas cylinder, or the typical storage container can be used as the purging vessel depending on the requirements of the specific application.

When released from the polymerized polymeric material 30, the gas flows out of the vessel by suitable means such as a discharge port or opening 24 in FIG. 1. A flow control valve 26 may be joined in fluid communication with the interior volume of the vessel. A pipe, conduit, hose, channel or other suitable device or assembly by which the fluid can be flowed out of the vessel may be connected to the vessel.

The present invention also provides a fluid storage and dispensing system. The system includes a fluid storage and dispensing vessel configured to selectively dispense a fluid therefrom. A suitable vessel is, for example, a container that can hold up to 1000 liters. A typical vessel size is about 44 liters. The vessel should be able to contain fluids at a pressure of up to about 2000 psi, preferably up to about 4000 psi. However, the vessel may also operate at around sub-atmospheric to atmospheric pressure. Preferably, the container is made of carbon steel, stainless steel, nickel or aluminum. In some cases the vessel may contain interior coatings in the form of inorganic coatings such as silicon and carbon, metallic coatings such as nickel, organic coatings such as paralyene or Teflon based materials. The vessel contains a polymerized polymeric material which reversibly takes up the fluid when contacted therewith. The fluid is releasable from the polymerized polymeric materials under dispensing conditions.

In one embodiment, the polymerized polymeric material used to store a fluid does not include imidazolium compounds. In another embodiment, the polymerized polymeric material used to store a fluid does not include a nitrogen-containing heterocyclic cation.

The fluids which may be stored, purified, or stabilized in the polymerized polymeric material 30 include, but are not limited to, alcohols, aldehydes, amines, ammonia, aromatic hydrocarbons, arsenic pentafluoride, arsine, boron trichloride, boron trifluoride, carbon dioxide, carbon disulfide, carbon monoxide, carbon sulfide, chlorine, diborane, dichlorosilane, digermane, dimethyl disulfide, dimethyl sulfide, disilane, ethane, ethers, ethylene oxide, fluorine, germane, germanium methoxide, germanium tetrafluoride, hafnium methylethylamide, hafnium t-butoxide, halogenated hydrocarbons, halogens, hexane, hydrogen, hydrogen cyanide, hydrogen halogenides, hydrogen selenide, hydrogen sulfide, ketones, mercaptans, methane, nitric oxides, nitrogen, nitrogen trifluoride, noble gases, organometallics, oxygen, oxygenated-halogenated hydrocarbons, phosgene, phosphine, phosphorus trifluoride, n-silane, pentakisdimethylamino tantalum, propane, silicon tetrachloride, silicon tetrafluoride, stibine, styrene, sulfur dioxide, sulfur hexafluoride, sulfur tetrafluoride, tetramethyl cyclotetrasiloxane, titanium diethylamide, titanium dimethylamide, trichlorosilane, trimethyl silane, tungsten hexafluoride, water, and mixtures thereof.

By way of illustration, examples of some of these classes of fluids will now be listed. However, scope of the invention is not limited to the following examples. Alcohols include ethanol, isopropanol, and methanol. Aldehydes include acetaldehyde. Amines include dimethylamine and monomethylamine. Aromatic compounds include benzene, toluene, and xylene. Ethers include dimethyl ether, and vinyl methyl ether. Halogens include chlorine, fluorine, and bromine. Halogenated hydrocarbons include dichlorodifluoromethane, tetrafluoromethane, chlorodifluoromethane, trifluoromethane, difluoromethane, methyl fluoride, 1,2-dichlorotetrafluoroethane, hexafluoroethane, pentafluoroethane, halocarbon 134a tetrafluoroethane, difluoroethane, perfluoropropane, octafluorocyclobutane, chlorotrifluoroethylene, hexafluoropropylene, octafluorocyclopentane, perfluoropropane, 1,1,1-trichloroethane, 1,1,2-trichloroethane, methyl chloride, and methyl fluoride. Ketones include acetone. Mercaptans include ethyl mercaptan, methyl mercaptan, propyl mercaptan, and n,s,t-butyl mercaptan. Nitrogen oxides include nitrogen oxide, nitrogen dioxide, and nitrous oxide. Organometallics include trimethylaluminum, triethylaluminum, dimethylethylamine alane, trimethylamine alane, dimethylaluminum hydride, tritertiarybutylaluminum, tritertiarybutylaluminum trimethylindium (TMI), trimethylgallium (TMG), triethylgallium (TEG), dimethylzinc (DMZ), diethylzinc (DEZ), carbontetrabromide ($CBr_4$), diethyltellurium (DETe) and magnesocene (Cp$_2$Mg). Metal halides include transition metals along with aluminum, gallium, indium, thallium, silicon, germanium, tin, bismith in combination with one or more halogen moieties such as fluorine, chlorine, bromine, and iodine. Oxygenated-halogenated-hydrocarbons include perfluoroethylmethylether, perfluoromethylpropylether, perfluorodimethoxymethane, and hexafluoropropylene oxide. Other fluids include vinyl acetylene, acrylonitrile, and vinyl chloride.

Other fluids which may be stored, purified, or stabilized in polymerized polymeric material 30 include materials used for thin film deposition applications. Such materials include, but are not limited to, tetramethyl cyclotetrasiloxane (TOMCTS), titanium dimethylamide (TDMAT), titanium diethylamide (TDEAT), hafnium t-butoxide (Hf(OtBu)4), germaniummethoxide (Ge(OMe)4), pentakisdimethylamino tantalum (PDMAT) hafnium methylethylamide (TEMAH) and mixtures thereof.

The fluids which may be stored in the polymerized polymeric material 30 may be divided into categories including stable gases, stable liquefied gases, unstable gases, unstable liquefied gases, stable low vapor pressure liquids, and unstable low vapor pressure liquids. The term stable is relative and includes gases which do not substantially decompose over the shelf life of a storage vessel at the typical temperatures and pressures at which those skilled in the art would store the gases. Unstable refers to materials which are prone to decomposition or reaction under typical storage conditions and thus are difficult to store.

Stable gases include nitrogen, argon, helium, neon, xenon, krypton; hydrocarbons include methane, ethane, and propanes; hydrides include silane, disilane, arsine, phosphine, germane, ammonia; corrosives include hydrogen halogenides such as hydrogen chloride, hydrogen bromide, and hydrogen fluoride, as well as chlorine, dichlorosilane, trichlorosilane, carbon tetrachloride, boron trichloride, tungsten hexafluoride, and boron trifluoride; oxygenates include oxygen, carbon dioxide, nitrous oxide, and carbon monoxide; and other gases such as hydrogen, deuterium, dimethyl ether, sulfur hexafluoride, arsenic pentafluoride, and silicon tetrafluoride.

Stable liquefied gases include inerts such as nitrogen and argon; hydrocarbons such as propane; hydrides such as silane, disilane, arsine, phosphine, germane, and ammonia; fluorinates such as hexafluoroethane, perfluoropropane, and perfluorobutane; corrosives such as hydrogen chloride, hydrogen bromide, hydrogen fluoride, chlorine, dichlorosilane, trichlorosilane, carbon tetrachloride, boron trichloride, boron trifluoride, tungsten hexafluoride, and chlorine trifluoride; and oxygenates such as oxygen and nitrous oxide.

Unstable gases include digermane, borane, diborane, stilbene, disilane, hydrogen selenide, nitric oxide, fluorine and organometallics including alanes, trimethyl aluminum and other similar gases. These unstable gases may also be liquefied.

In one embodiment, a fluid such as fluorine could be stored with fully fluorinated polymerized polymeric material.

Figure 3:
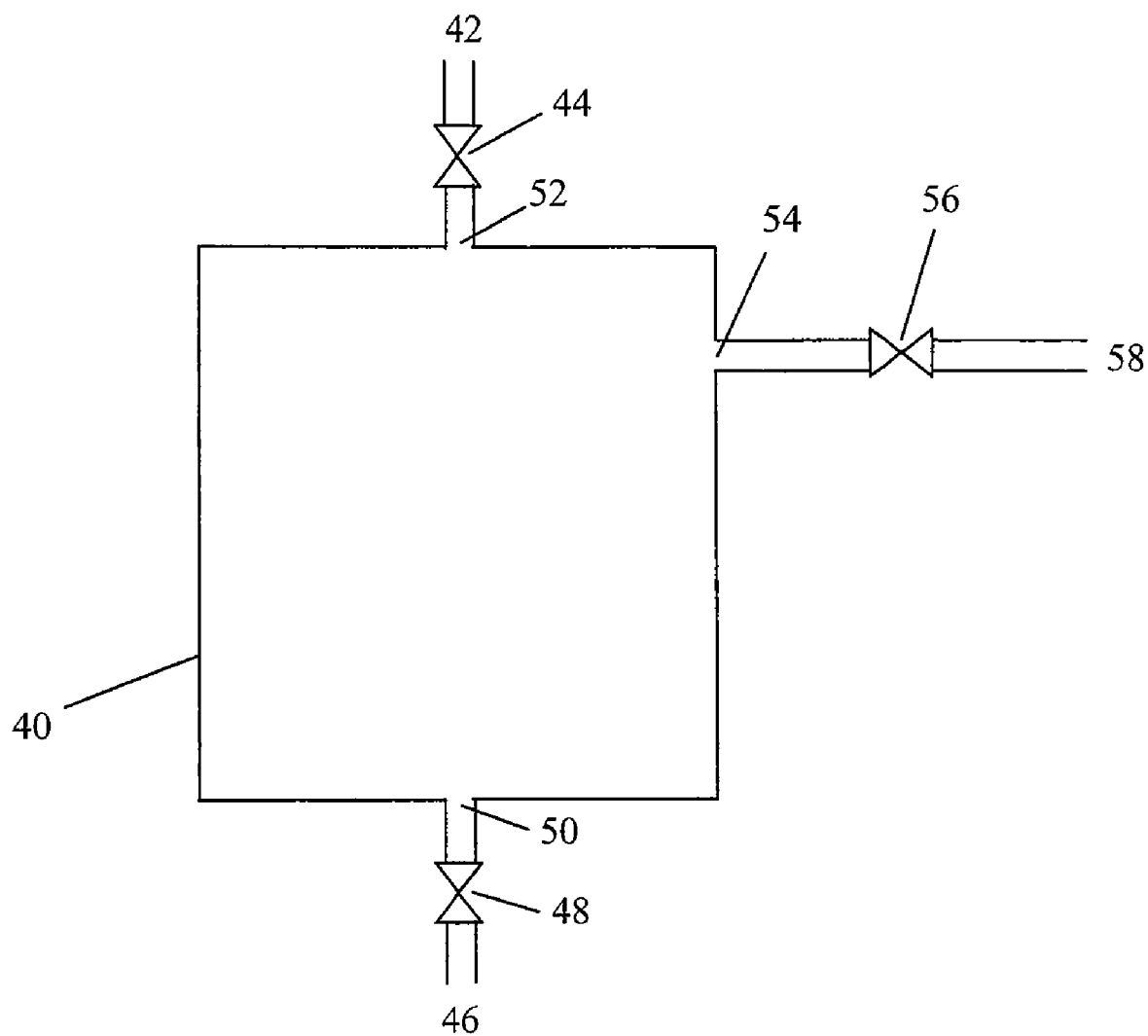
FIG. 3 shows an embodiment of a device for storing a fluid with a polymerized polymeric material.

The present invention also provides a method of separating an impurity from a fluid mixture. In this instance, the fluid mixture includes a fluid and the impurity. FIG. 3 shows an embodiment of a device 40 for purifying a fluid with a polymerized polymeric material. A device containing the polymerized polymeric material is configured for contacting the polymerized polymeric material with the fluid mixture. A source 46 for the fluid mixture is controlled by valve 48. The fluid mixture is introduced through inlet 50 into the device 40 and contacted with the polymerized polymeric material. The polymerized polymeric material in a powdered or granular form is introduced through inlet 52 from polymerized polymeric material source 42 by valve 44. A portion of the impurities is retained within the polymerized polymeric material to produce a purified fluid. The purified fluid is released from the device through outlet 54, which is controlled by valve 56.

Figure 4:
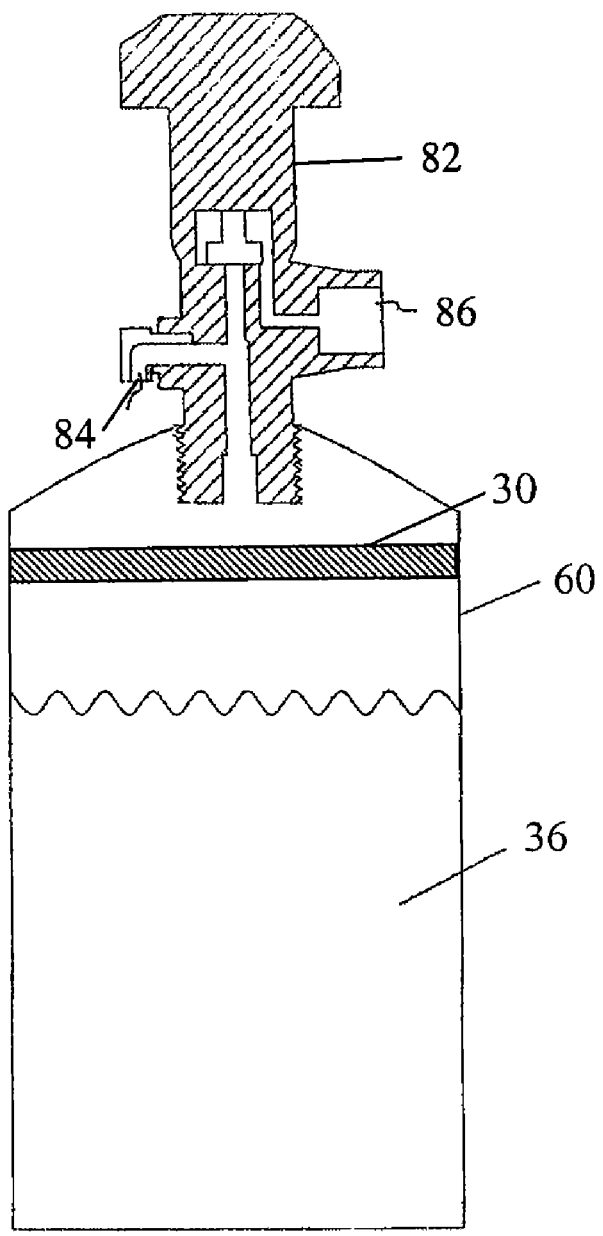
FIG. 4 shows another embodiment of a device for storing a fluid with a polymerized polymeric material.

FIG. 4 shows an embodiment of a vessel 60 for storing and purifying a fluid using a polymerized polymeric material 30. An ionic liquid 36 is supplied to the vessel and the polymerized polymeric material 30 is prepared before valve assembly 82 is inserted into the vessel 60. The polymerized polymeric material 30 serves as a physical barrier between the ionic liquid 36 and the outlet port 86, preventing the liquid from entering the outlet port. The fluid is then added to the vessel 60 containing the polymerized polymeric material 30 and the ionic liquid 36 in the conventional fashion through inlet port 84 in valve assembly 82. The vessel 60 would then be mechanically agitated to contact the fluid with the ionic liquid 36. The purified fluid may be removed through outlet port 86 as the impurities in the fluid would be retained by the polymerized polymeric material 30. Liquid impurities would be prevented from entering the outlet port by the polymerized polymeric material 30.

It is understood that the fluid and fluid mixture may include liquids, vapors (volatilized liquids), gaseous compounds, and/or gaseous elements. Furthermore, while reference is made to "purified," it is understood that purified may include purification to be essentially free of one or more impurities, or simply lowering the lower level of impurities in the fluid mixture. Impurities include any substance that may be desirable to have removed from the fluid mixture, or are undesirable within the fluid mixture. Impurities included can be variants or analogs of the fluid itself if they are undesirable. Impurities that would typically be desired to be removed include but are not limited to water, $CO_2$, oxygen, CO, NO, $NO_2$, $N_2O_4$, $SO_2$, $SO_3$, SO, $S_2O_2$, $SO_4$, and mixtures thereof. Additionally, impurities include but are not limited to derivatives of the fluid of interest. For example, higher boranes are considered impurities within diborane. Disilane is considered an impurity in silane. Phosphine could be considered an impurity in arsine, and HF could be considered an impurity in $BF_3$.

The polymerized polymeric materials used in the purification process of the present invention may be any of the previously mentioned classes of polymerized polymeric materials, that is inorganic, organic, hybrid polymers or combination thereof. However, it should be understood that certain polymerized polymeric materials will be better suited to removing certain impurities. It should also be understood that certain polymerized polymeric materials will be better suited to working with certain fluids. In one embodiment, the polymerized polymeric material used for purification does not comprise a nitrogen-containing heterocyclic cation. The fluid which may be purified includes any of the previously mentioned fluids.

Contacting the polymerized polymeric material with the fluid mixture may be accomplished in any of the variety of ways. The process is selected to promote intimate mixing of the polymerized polymeric material and the fluid mixture and is conducted for a time sufficient to allow significant removal of targeted components. Thus, systems maximizing surface area contact between the polymerized polymeric material and the fluid mixture are desirable.

In one embodiment, the device is a vessel and the step of contacting the fluid mixture with the polymerized polymeric material comprises flowing the fluid mixture through the polymerized polymeric material, as shown in FIG. 4 and previously described. In another embodiment, a scrubbing stack is used to contact the fluid mixture with the polymerized polymeric material, with the fluid mixture and the polymerized polymeric material flowing into the scrubbing stack. In another embodiment, the vessel containing the fluid and the polymerized polymeric material is mechanically agitated in order to contact the fluid with the polymerized polymeric material. In another embodiment, countercurrent flow of the polymerized polymeric material and the fluid is used to contact the fluid with the polymerized polymeric material in the device. In another embodiment, the fluid is a liquid, and the liquid and the polymerized polymeric material are mixed to contact the fluid with the polymerized polymeric material in the device. In an effort to maximize the surface area contact between the polymerized polymeric material and the fluid mixture the polymerized polymeric material may be prepared as planar or curved surfaces or as free standing particles, as well as many other configurations which will become evident based on this disclosure of the present invention. Furthermore the polymerized polymeric material preferably has a high surface area layer containing pores with a high effective surface area, and thus increasing the number of storage sites on the polymerized polymeric material. The polymerized polymeric materials are capable of being formed in a wide variety of predeterminable distribution, structure, morphology, composition, and functionality.

In another aspect of the invention, a method of separating an impurity from a fluid mixture is provided which uses a small amount of polymerized polymeric material. The fluid mixture is contacted with the polymerized polymeric material for the purpose of purification only and not for uptake of the fluid by the polymerized polymeric material. Thus, a device or vessel is used to contact a small amount of polymerized polymeric material with the fluid mixture. In this manner, a substantially less amount of polymerized polymeric material could be required to obtain the purification effect compared to the previous illustration wherein the unstable fluid could be taken up completely or dissolved within the polymerized polymeric material. A portion of the impurity is retained within the polymerized polymeric material to produce a purified fluid.

In another aspect of the invention, a method of stabilizing an unstable fluid is provided which uses a small amount of polymerized polymeric material. The unstable fluid is contacted with the polymerized polymeric material for the purpose of stabilization only and not for uptake of the fluid by the polymerized polymeric material. Thus, a device or vessel is used to contact a small amount of polymerized polymeric material with the fluid. In this manner, a substantially less amount of polymerized polymeric material could be required to obtain the stabilization effect compared to an illustration wherein the unstable fluid could be taken up completely or dissolved within the polymerized polymeric material. No decomposition products, or substantially less decomposition products, are produced as a result of the contact of the unstable fluid with the polymerized polymeric material, producing a stabilized fluid.

Polymerized polymeric material which has been dried or baked, thus leaving it substantially anhydrous, may exhibit greater overall capacity for removing some gaseous components. The presence of water or other impurities in the polymerized polymeric material may reduce the capacity of the polymerized polymeric material for dissolving fluid components. In addition, the presence of water or other impurities may decrease the solubility of certain fluid components, especially those fluid components that are hydrophobic. Dried baked polymerized polymeric materials may exhibit differential selectivities between various fluid components when compared to those polymerized polymeric material containing measurable amounts of dissolved water, such as polymerized polymeric material having been exposed to humid atmospheres. Polymerized polymeric material may be dried by conventional methods, such as by heat treatment, exposure to a reduced pressure environment, or a combination of heat and reduced pressure.

It is known that gas solubility in various liquids, including polymerized polymeric material, is dependent upon temperature and pressure. Different gas components may each elicit a different sensitivity to temperature and/or pressure changes as pertains to the solubility of the gas component in the polymerized polymeric materials. This differential temperature and/or temperature dependence may be advantageously exploited by conducting variations of the process of the present invention at different temperatures and pressures to optimize gas component separation.

The present invention also provides a method for both storing and purifying a fluid mixture comprising a fluid and an impurity. A vessel contains a polymerized polymeric material and is configured for contacting the polymerized polymeric material with the fluid mixture. The fluid and the polymerized polymeric material may be any of the previously mentioned fluids and polymerized polymeric material. The fluid is contacted with the polymerized polymeric material for take-up of the fluid by the polymerized polymeric material. This may be accomplished by any of the previously described methods of promoting intimate mixing of the polymerized polymeric material and the fluid mixture, or any other suitable method. A portion of the impurities is retained within the polymerized polymeric material to produce a purified fluid. The purified fluid can then be released from the device.

The present invention also provides a method of storing and stabilizing an unstable fluid. The unstable fluid may be any of the previously mention unstable fluids, or any other fluid that tends to decompose or react. The polymerized polymeric materials may be any of the previously mentioned polymerized polymeric materials. The unstable fluid is contacted with the polymerized polymeric materials for take-up of the unstable fluid by the polymerized polymeric materials. The unstable fluid may be then stored within the polymerized polymeric materials for a period of time, during which period of time the decomposition rate is at least reduced, and preferably there is substantially no decomposition of the unstable fluid. In one embodiment, the rate of decomposition is reduced by at least about 50%, more preferably at least about 75%, and most preferably at least about 90%, compared with storage of the fluid under the same temperature and pressure conditions without using an polymerized polymeric materials. In the context of an unstable fluid, substantially no decomposition means that less than 10% of the molecules of the unstable fluid undergo a chemical change while being stored. In one embodiment, the proportion of molecules that undergo a decomposition reaction is preferably less than 1%, more preferably less than 0.1%, and most preferably less than 0.01%. Although it is most preferable for the decomposition rate to be less than 0.01%, it should be noted that in certain applications a rate of decomposition of less than 50% over the storage period of the fluid would be useful. The period of time may range from a few minutes to several years, but is preferably at least about 1 hour, more preferably at least about 24 hours, even more preferably at least about 7 days, and most preferably at least about 1 month.

The unstable fluid may be selected from categories such as dopants, dielectrics, etchants, thin film growth, cleaning, and other semiconductor processes. Examples of unstable fluids include, but are not limited to, digermane, borane, diborane, disilane, fluorine, halogenated oxy-hydrocarbons, hydrogen selenide, stilbene, nitric oxide, organometallics and mixtures thereof.

The present invention also provides a method of storing and purifying a fluid mixture. The storage vessel containing polymerized polymeric material is provided with a purifying solid or liquid for contact with the fluid mixture. The purifying solid or liquid retains at least a portion of the impurity in the fluid mixture to produce a purified fluid when the fluid is released from the storage vessel. The purifying solid or liquid may be used with any of the previously mentioned fluids and polymerized polymeric material.

Various purifying materials may be used with the present invention. The purification or impurity removal can be used to remove impurities from the polymerized polymeric materials which could change the solubility of a fluid in the polymerized polymeric material. Alternatively, the purification material could remove only impurities present in the incoming gas or contributed from the fluid storage vessel that will be stored in the polymerized polymeric materials. Finally, the purification material could have the ability to remove impurities from both the fluid of interest and the polymerized polymeric materials simultaneously. The purification materials include, but are not limited to, alumina, amorphous silica-alumina, silica ($SiO_2$), aluminosilicate molecular sieves, titania ($TiO_2$), zirconia ($ZrO_2$), and carbon. The materials are commercially available in a variety of shapes of different sizes, including, but not limited to, beads, sheets, extrudates, powders, tablets, etc. The surface of the materials can be coated with a thin layer of a particular form of the metal (e.g., a metal oxide or a metal salt) using methods known to those skilled in the art, including, but not limited to, incipient wetness impregnation techniques, ion exchange methods, vapor deposition, spraying of reagent solutions, co-precipitation, physical mixing, etc. The metal can consist of alkali, alkaline earth or transition metals. Commercially available purification materials includes a substrate coated with a thin layer of metal oxide (known as NHX-Plus™) for removing $H_2O$, $CO_2$ and $O_2$, $H_2S$ and hydride impurities, such as silane, germane and siloxanes; ultra-low emission (ULE) carbon materials (known as HCX™) designed to remove trace hydrocarbons from inert gases and hydrogen; macroreticulate polymer scavengers (known as OMA™ and OMX-Plus™) for removing oxygenated species ($H_2O$, $O_2$, CO, $CO_2$, $NO_x$, $SO_x$, etc.) and non-methane hydrocarbons; and inorganic silicate materials (known as MTX™) for removing moisture and metals. All of these are available from Matheson Tri-Gas®, Newark, Calif. Further information on these purifying materials and other purification materials is disclosed in U.S. Pat. Nos. 4,603,148; 4,604,270; 4,659,552; 4,696,953; 4,716,181; 4,867,960; 6,110,258; 6,395,070; 6,461,411; 6,425,946; 6,547,861; and 6,733,734, the contents of which are hereby incorporated by reference. Other solid purification materials typically available from Aeronex, Millipore, Mykrolis, Saes Getters, Pall Corporation, Japan Pionics and used commonly in the semiconductor gas purification applications are known in the art and are intended to be included within the scope of the present invention.

Additionally, any of the previously described storage, stabilization, and purification methods and systems may be combined to provide multiple effects. One, two or all three methods can be independently combined to obtain a process that is best suited for the application of interest. Therefore, it is conceivable that any one method or the combination of any of the methods could be used for different requirements and applications. The basic steps of these combined methods will now be set forth. It will be apparent that the information previously described for the individual methods will also be applicable for the combined methods described below. The fluids and the polymerized polymeric materials used in the combined processes may be any of the previously mentioned fluids and polymerized polymeric materials.

The storage method may be combined with the method of purifying using a purifying solid. In this method, a vessel containing a polymerized polymeric materials is provided. The fluid mixture is contacted with the polymerized polymeric materials for take-up of the fluid by the polymerized polymeric materials. There is substantially no chemical change in the polymerized polymeric materials and the fluid. A purifying solid is provided for contact with the fluid mixture. A portion of the impurity is retained by the purifying solid to produce a purified fluid.

The methods of storage, stabilizing, and purifying using a purifying solid may also be combined. A vessel containing a polymerized polymeric material is provided. The fluid mixture is contacted with the polymerized polymeric material for take-up of the fluid mixture by the polymerized polymeric material. A purifying solid is provided for contact with the fluid mixture. A portion of the impurity is retained by the purifying solid to produce a purified fluid. The polymerized polymeric material is stored for a period of time of at least about one hour, during which period of time there is substantially no degradation of the unstable fluid.

The methods of storage, stabilizing, and purifying using the polymerized polymeric materials may also be combined. A device containing a polymerized polymeric material and configured for contacting the polymerized polymeric material with the fluid mixture is provided. The fluid mixture is introduced into the device. The fluid mixture is contacted with the polymerized polymeric material. The fluid mixture may then be stored within the polymerized polymeric material for a period of time of at least about one hour, during which period of time there is substantially no degradation of the said fluid. A portion of the impurities are retained within the polymerized polymeric material to produce a purified fluid, and the purified fluid may then be released from the device.

The two purification methods may also be combined. A device containing a polymerized polymeric material and a purifying solid therein for contact with the fluid mixture is provided. The fluid mixture is introduced into the device. The fluid mixture is contacted with the polymerized polymeric material and with the purifying solid. A first portion of the impurity is retained within the polymerized polymeric material and a second portion of the impurity is retained by the purifying solid, to produce a purified fluid. The purified fluid may then be released from the device.

The storage method may be combined with both methods of purifying. A vessel containing a polymerized polymeric materials and a purifying solid therein for contact with the fluid mixture is provided. The fluid is contacted with the polymerized polymeric material for take-up of the fluid by the polymerized polymeric material. A first portion of the impurity is retained within the polymerized polymeric material and a second portion of the impurity is retained by the purifying solid, to produce a purified fluid. The purified fluid may then be released from the device.

The storage and stabilization methods may be combined with both methods of purifying. A vessel containing a polymerized polymeric materials and a purifying solid therein for contact with the fluid mixture is provided. The fluid mixture is introduced into the device. The fluid is contacted with the polymerized polymeric material for take-up of the fluid by the polymerized polymeric material. The fluid mixture is stored within the polymerized polymeric materials for a period of time of at least about one hour, during which period of time there is substantially no degradation of the unstable fluid. A first portion of the impurity is retained within the polymerized polymeric material and a second portion of the impurity is retained by the purifying solid, to produce a purified unstable fluid. The purified fluid may then be released from the device.

The stabilization methods may be combined with both methods of purifying. A vessel containing a polymerized polymeric materials and a purifying solid therein for contact with the fluid mixture is provided. The unstable fluid mixture is introduced into the device. The unstable fluid is contacted with the polymerized polymeric material primarily for the purposes of stabilization and purification only, and not for the purposes of uptake of the fluid by the polymerized polymeric material. Thus, a device or vessel is used to contact polymerized polymeric material with the fluid. In this manner, a substantially less amount of polymerized polymeric material could be required to obtain the stabilization effect and the purification effect compared to the previous illustrations wherein the unstable fluid could be taken up by the polymerized polymeric material. No decomposition products, or substantially less decomposition products, are produced as a result of the contact of the unstable fluid with the polymerized polymeric materials, producing a stabilized fluid. The fluid mixture is stored in contact with the polymerized polymeric materials for a period of time of at least about one hour, during which period of time there is substantially no degradation of the unstable fluid. A portion of the impurity is retained within the polymerized polymeric material to produce a purified fluid. The purified fluid may then be released from the device.

In another aspect of the present invention, cosolvents can be combined with polymerized polymeric materials for the purpose of storage, purification, stabilization, and combinations thereof. Cosolvency, also known as solvent blending, is a process used to increase the solubility of a chemical compound in a given solvent. This is achieved by adding a portion of a different solvent (cosolvent) to the given solvent. In general, the more interaction between the cosolvent and the given solvent, such as miscibility, the more effective the cosolvency is. Conventionally, cosolvents are used to increase the water solubility of substances that normally have poor water solubility, by adding water-miscible organic solvents. In the present invention, the presence of cosolvent combined with polymerized polymeric material can provide enhanced interaction between the fluid and the polymerized polymeric material.

In the present invention, cosolvents are any compounds which provide enhanced interaction between the fluid and the polymerized polymeric material. For example, the solubility of the fluid in the polymerized polymeric material can be increased by adding a particular cosolvent for the purpose of storing the fluid. Also, the solubility of fluid impurities in the polymerized polymeric material could be increased by adding a particular cosolvent for the purpose of purifying the fluid. The solubility of decomposition species could be decreased or increased by the use of cosolvents with the polymerized polymeric material for the purpose of preventing decomposition. The solubility of unstable species could be increased or decreased by the use of cosolvents with the polymerized polymeric material for the purpose of stabilization. The intermolecular distances found between two molecules of the fluid taken up by the ionic liquids could be increased by the addition of a particular cosolvent. This would prevent condensation reactions between molecules of the fluid in the ionic liquids, providing stabilization. Additionally, the presence of cosolvents can alter the equilibrium of the decomposition reaction and shift the reaction such that decomposition of the fluid is not favored.

In one aspect of this invention, the cosolvent is combined with the polymerized polymeric material after the polymeric material has been polymerized.

In another aspect of this invention the cosolvent is combined with the polymeric material precursors prior to polymerization. In this case, the cosolvent is not polymerized and remains available for the purpose of enhancing interaction with the fluid.

Thus, a cosolvent may be used with polymerizable materials prior to polymerization for any of the processes described herein in order to enhance the performance of the process. For example, a mixture comprising a cosolvent and polymerizable materials is polymerized and provided within a suitable vessel for storing a fluid. The fluid is contacted with the mixture of polymerized polymeric material and cosolvent for take-up of the fluid by the mixture. The fluid is released from the mixture and dispensed from the vessel.

As another example, a cosolvent may be combined with a polymerized polymeric material provided within a vessel. The fluid is contacted with the mixture of polymerized polymeric material and cosolvent for take-up of the fluid. The fluid is released from the mixture and dispensed from the vessel.

As another example, to purify a fluid mixture containing a fluid and an impurity, a device is provided which contains a mixture of polymerized polymeric material and cosolvent. The fluid mixture is introduced into the device. The fluid mixture is contacted with the mixture of polymerized polymeric material and cosolvent. A portion of the impurity is retained within the polymerized polymeric material, within the cosolvent, or within the mixture of the cosolvent and the polymerized polymeric material, to produce a purified fluid. The purified fluid is then released from the device.

As another example, to stabilize an unstable fluid, a mixture of polymerized polymeric material and a cosolvent are provided within a vessel. The unstable fluid is introduced into the vessel. The unstable fluid is contacted with the mixture of polymerized polymeric material and cosolvent. The fluid is stored within the vessel for a period of time, during which period of time there is substantially no decomposition of the unstable fluid.

The cosolvents and polymerized polymeric materials can be used in various combinations for the various methods described herein. For example, one type of polymerized polymeric material and cosolvent can be used for storage and a second type of polymerized polymeric material and cosolvent used for purification, in a process for both storage and purification. Similarly, one type of polymerized polymeric material and cosolvent can be used for storage, a second type of polymerized polymeric material and cosolvent used for purification and a third type of polymerized polymeric material and cosolvent used for stabilization, in a process including storage, purification, and stabilization of a fluid. Various other combinations of the processes disclosed herein will be apparent. It is intended that the elements of these processes and the polymerized polymeric materials and cosolvents can be mixed, matched and combined in a variety of combinations prior to polymerization for different applications and different requirements.

In one embodiment, the amount of cosolvent used is less than the amount of polymerized polymeric materials used in the process. The amount of cosolvent is preferably between about 0.1% and about 100% of the amount of polymerized polymeric material used. More preferably, the amount of cosolvent is less than about 50% of the polymerized polymeric material and most preferably, less than about 25% of the polymerized polymeric material. In various other embodiments, the amount of cosolvent used relative to the amount of polymerized polymeric material used may be less than about 10%, 5%, and 1%. The relative amount of the cosolvent will depend on the polymerized polymeric material and fluid mixture, as well as the operating conditions of the process.

In another embodiment, the amount of polymerized polymeric material used is less than the amount of cosolvent used in the process. The amount of polymerized polymeric material is preferably between about 1% and about 100% of the amount of cosolvent used. In various other embodiments, the amount of polymerized polymeric material used relative to the amount of cosolvent used may be less than about 50%, 25%, 5%, and 1%.

A variety of cosolvents can be used in the present invention. Additionally, two or more cosolvents may be combined for use in any aspects of the present invention. In one embodiment, the cosolvent is selected from liquid phase compounds. In another embodiment, the cosolvent is selected from gas phase compounds. In another embodiment, the cosolvent is selected from solid phase compounds. The cosolvents can be used in combination with the precursors of polymerized polymeric materials or mixtures of precursors of polymerized polymeric materials and the resulting mixture is then polymerized to form the polymerized polymeric materials of the present invention and cosolvent.

The cosolvents may include molecular compounds as well as ionic compounds. The cosolvents may include organic and inorganic compounds. The cosolvents may be in the solid phase, the liquid phase, or the gas phase. Cosolvents include but are not limited to hydrocarbons, cycloalkanes, aromatic hydrocarbons, halogenated hydrocarbons, alcohols, aldehydes, ketones, furans, amines, amides, imides, ionic liquids, nitriles, ethers, esters, epoxides, pyridiniums, pyrrolidiniums, phenols, sulfates, sulfites, sulfides, sulfoxides, thiols, carbonyls, hydrides, halogens, water, carbon dioxide, oxygen, noble gases, organometallics and mixtures thereof. Cosolvents also include, but are not limited to, inorganic compounds comprising alkaline salts, alkaline earth metal salts, transition metal complexes, lanthanide complexes, actinide complexes, ionic liquids with metal containing anions. Cosolvents also include, but are not limited to, inorganic acids comprised of the following anions: sulfates, nitrates, chlorates, phosphates, borates, carbonates, acetates, and halides. Cosolvents also include, but are not limited to, inorganic bases comprised of hydroxide anions. Cosolvents also include, but are not limited to, organic acids.

Possible solid cosolvents include but are not limited to alkaline halogenated salts, alkaline earth halogenated salts, transition metal halogenated salts, lanthanide metal halogenated salts and actinide metal halogenated salts. Other solid cosolvents include neutral metal species such as organometallic compounds bearing a single neutral metal atom, or a cluster of neutral metal atoms, or larger clusters of neutral metal atoms, or neutral metal nanoparticles either suspended in solution or adhering to the polymerized polymeric materials.

Preferred cosolvents used in the present invention include alcohols, aldehydes, amines, ammonia, aromatic hydrocarbons, arsenic pentafluoride, arsine, boron trichloride, boron trifluoride, carbon dioxide, carbon disulfide, carbon monoxide, carbon sulfide, chlorine, diborane, dichlorosilane, digermane, dimethyl disulfide, dimethyl sulfide, disilane, ethane, ethers, ethylene oxide, fluorine, germane, germanium methoxide, germanium tetrafluoride, hafnium methylethylamide, hafnium t-butoxide, halogenated hydrocarbons, halogens, hexane, hydrogen, hydrogen cyanide, hydrogen halogenides, hydrogen selenide, hydrogen sulfide, ionic liquids, ketones, mercaptans, methane, nitric oxides, nitrogen, nitrogen trifluoride, noble gases, organometallics, oxygen, oxygenated-halogenated hydrocarbons, phosgene, phosphine, phosphorus trifluoride, n-silane, pentakisdimethylamino tantalum, propane, silicon tetrachloride, silicon tetrafluoride, stibine, styrene, sulfur dioxide, sulfur hexafluoride, sulfur tetrafluoride, tetramethyl cyclotetrasiloxane, titanium diethylamide, titanium dimethylamide, trichlorosilane, trimethyl silane, tungsten hexafluoride, water, and mixtures thereof.

Most preferred cosolvents include alcohols, water, hydrogen, ammonia, carbon dioxide, carbonyls, cyanides, sulfides, oxygen, hydrocarbons, halogenated hydrocarbons, ionic liquids, oxygenated hydrocarbons, hydrides, hydrogen halogenides, halides, and mixtures thereof.

EXAMPLES

For all the following Examples, a canister of polymerized polymeric materials is prepared by the following method. A stainless steel canister with a dip tube is charged with a known quantity of the precursors for making polymerized polymeric materials. The charged canister is thermally controlled by a PID temperature controller or variac with a heating element and a thermocouple. The canister is placed on a gravimetric load cell or weight scale and a pressure gauge is connected to the canister to measure head pressure. This canister is connected to a manifold with vacuum capability and to a gas source. The canister is also connected to an analyzer (such as FT-IR, GC, APIMS, etc.).

The polymerization reaction is conducted within the canister resulting in a canister charged with polymerized polymeric material that conforms to the inside shape of the cylinder. A procedure is conducted to remove any undesirable byproducts of the reaction from the vessel. A vacuum bake procedure is conducted on the canister charged with the polymerized polymeric material and the manifold up to the gas cylinder, by pulling a vacuum while heating. This removes any trace moisture and other volatile impurities from the polymerized polymeric materials and the gas distribution components. The polymerized polymeric material is allowed to cool to the desired operating temperature. The mass of the vacuum baked canister and polymerized polymeric materials is recorded.

Example 1

Storage of a Gas in a Polymerized Polymeric Material—Arsine Stored in Nylon

A vessel containing nylon is prepared as described above.

The source gas, $AsH_3$ or a gas mixture containing $AsH_3$, is then introduced into the vessel, at 5 psig, until the uptake of $AsH_3$ is complete. The uptake can be determined gravimetrically, or by analytical methods. For example, the concentration or absolute amount of the $AsH_3$ can be measured at the inlet of the vessel and the outlet of the canister. $AsH_3$ will continue to be introduced until the inlet and outlet concentrations are equivalent, indicating the nylon is saturated and cannot accept any further $AsH_3$ under the existing conditions. At this time, the source gas flow is stopped.

The nylon-charged vessel is then heated, a pressure differential is applied, or it is sparged with an inert gas, in order to deliver the stored $AsH_3$. The delivered gas is analyzed for $AsH_3$ content. This can be determined gravimetrically or analytically. The total amount introduced is compared to the total amount removed to determine the loading factor of the cylinder.

Example 2

Storage of a Gas in a Polymerized Polymeric Material—$CO_2$ Stored in poly[1-(4-vinylbenzyl)-3-butyl Imidazolium Tetrafluoroborate] (PVBIT)

A vessel containing PVBIT is prepared as described above.

The source gas, $CO_2$ or a gas mixture containing $CO_2$, is then introduced into the vessel, at 5 psig, until the uptake of $CO_2$ is complete. The uptake can be determined gravimetrically, or by analytical methods. For example, the concentration or absolute amount of the $CO_2$ can be measured at the inlet of the vessel and the outlet of the canister. $CO_2$ will continue to be introduced until the inlet and outlet concentrations are equivalent, indicating the PVBIT is saturated and cannot accept any further $CO_2$ under the existing conditions. At this time, the source gas flow is stopped.

The PVBIT-charged vessel is then heated, a pressure differential is applied, or it is sparged with an inert gas, in order to deliver the stored $CO_2$. The delivered gas is analyzed for $CO_2$ content. This can be determined gravimetrically or analytically. The total amount introduced is compared to the total amount removed to determine the loading factor of the cylinder.

Example 3

Storage and Stabilization and Purification of a Gas in a Polymerized Polymeric Material Using an Ionic Liquid Cosolvent—$B_2H_6$ Stored in poly[1-(4-vinylbenzyl)-3-butyl Imidazolium Tetrafluoroborate] (PVBIT) with 1-ethyl-3-methylimidazolium Tetrafluoroborate ([emim][BF4]) cosolvent A vessel containing PVBIT is prepared as described above. A known amount of [emim][BF4] is added to the PVBIT-charged vessel and a vacuum bake procedure is conducted providing a PVBIT/[emim][BF4]-charged vessel.

The source gas, $B_2H_6$ or a gas mixture containing $B_2H_6$, is analyzed while by-passing the charged vessel, in order to determine the concentration of $B_2H_6$, impurities, and decomposition products. Once these concentrations in the source gas have been established, source gas is flowed into the PVBIT/[emim][BF4]-charged vessel at a pressure of 5 psig, until the uptake of $B_2H_6$ is complete. The uptake can be determined gravimetrically, or by analytical methods. For example, the concentration or absolute amount of the $B_2H_6$ can be measured at the inlet of the vessel and the outlet of the canister. $B_2H_6$ will continue to be introduced until the inlet and outlet concentrations are equivalent, indicating the polymerized polymeric material is saturated and cannot accept any further $B_2H_6$ under the existing conditions. At this time, the source gas flow is stopped.

The PVBIT/[emim][BF4]-charged vessel containing $B_3H_6$ is then heated, a pressure differential is applied, or it is sparged with an inert gas, in order to deliver the stored $B_2H_6$. The delivered gas from the outlet of the vessel is analyzed for $B_2H_6$, impurities, and decomposition products.

Stabilization of the source $B_2H_6$ is determined by the lack of, or a decrease in the decomposition products detected in the stored gas compared to the source gas, in addition to quantitative recovery of $B_2H_6$.

Purification of the source $B_2H_6$ is determined by the lack of, or a decrease in the impurities detected in the delivered gas from the canister compared to the source gas. The capacity of the PVBIT/[emim][BF4] material for impurities is calculated by measuring the total moles of impurities removed for the moles of PVBIT and [emim][BF4] with which the canister was charged.

Example 4

Storage of a Gas in a Polymerized Polymeric Material using a Molecular Cosolvent—$B_2H_6$ Stored in poly[1-(4-vinylbenzyl)-3-butyl Imidazolium Tetrafluoroborate] (PVBIT) with $CO_2$ Cosolvent A vessel containing PVBIT is prepared as described above. A known amount of $CO_2$ is added to the PVBIT-charged vessel providing a PVBIT/$CO_2$-charged vessel.

The source gas, $B_2H_6$ or a gas mixture containing $B_2H_6$, is then introduced into the vessel, at 5 psig, until the uptake of $B_2H_6$ is complete. The uptake can be determined gravimetrically, or by analytical methods. For example, the concentration or absolute amount of the $B_2H_6$ can be measured at the inlet of the vessel and the outlet of the canister. $B_2H_6$ will continue to be introduced until the inlet and outlet concentrations are equivalent, indicating the PVBIT and $CO_2$ is saturated and cannot accept any further $B_2H_6$ under the existing conditions. At this time, the source gas flow is stopped.

The PVBIT/$CO_2$-charged vessel is then heated, a pressure differential is applied, or it is sparged with an inert gas, in order to deliver the stored $B_2H_6$. The delivered gas is analyzed for $B_2H_6$ content. This can be determined gravimetrically or analytically. The total amount introduced is compared to the total amount removed to determine the loading factor of the cylinder.

The embodiments described above and shown herein are illustrative and not restrictive. The scope of the invention is indicated by the claims rather than by the foregoing description and attached drawings. The invention may be embodied in other specific forms without departing from the spirit of the invention. Accordingly, these and any other changes which come within the scope of the claims are intended to be embraced therein.

What is claimed is:

1. A method of separating an impurity from a fluid mixture comprising a fluid and the impurity, comprising:
   providing a device containing hybrid polymers;
   introducing the fluid mixture into said device;
   contacting the fluid mixture with said hybrid polymers;
   allowing the impurity to be retained within said hybrid polymers to produce a purified fluid; and
   storing the fluid in said device wherein said purified fluid is ultimately dispensed from said device by an end user separately from the impurity.

2. The method of claim 1 wherein said hybrid polymers are polymerized within said device prior to introduction of the fluid mixture.

3. The method of claim 1 wherein said hybrid polymers are polymerized prior to placement within said device, and the fluid mixture is stored in said device.

4. The method of claim 1 wherein said hybrid polymers comprise, metal-organic frameworks, coordination polymers, silicones, silsesquioxanes, ionic liquid polymers with metal containing anions or combinations thereof.

5. A method of stabilizing a an unstable fluid, comprising:
   providing a vessel;
   providing hybrid polymers within said vessel;
   introducing the unstable fluid into the vessel;
   contacting the unstable fluid with said hybrid polymers; and
   storing the unstable fluid within said vessel for a period of time of at least about 1 hour, during which period of time there is reduced decomposition of the unstable fluid.

6. The method of claim 5 wherein said hybrid polymers are polymerized within said vessel prior to introduction of the unstable fluid.

7. The method of claim 5 wherein said hybrid polymers are polymerized prior to placement within said vessel.

8. The method of claim 5 wherein said hybrid polymers comprise, metal-organic frameworks, coordination polymers, silicones, silsesquioxanes, ionic liquid polymers with metal containing anions or combinations thereof.

9. A method of storing, purifying, and dispensing a fluid mixture comprising a fluid and an impurity, comprising:
providing a vessel;
providing a polymerized polymeric material within the vessel wherein said polymerized polymeric material is selected from the group consisting of inorganic polymers and hybrid polymers;
contacting the fluid mixture with said polymerized polymeric material for take-up of the fluid mixture by said polymerized polymeric material; and
allowing the impurity to be retained within said polymerized polymeric material to produce a purified fluid that is ultimately dispensed from said vessel by an end user separately from the impurity.

10. The method of claim 9 wherein said polymerized materials are polymerized within said vessel prior to introduction of the fluid mixture.

11. The method of claim 9 wherein said polymerized polymeric materials are polymerized prior to placement within said vessel.

12. The method of claim 9 wherein said inorganic polymers comprise, zeolites, clays, layered oxide materials, aluminophosphates, germanates, aluminosilicates, germanium phosphates, oxides, nitrides, metal halides, minerals, xerogels, aerogels, metal oxides and alloys derived from inorganic polymeric gels, sintered glass, other forms and types of generally non-organic materials or combinations thereof.

13. The method of claim 9 wherein said hybrid polymers comprise, metal-organic frameworks, coordination polymers, silicones, silsesquioxanes, ionic liquid polymers with metal containing anions or combinations thereof.

14. A method of storing, stabilizing, and dispensing an unstable fluid, comprising:
providing a vessel;
providing a hybrid polymer within the said vessel;
contacting the unstable fluid with said hybrid polymer for take-up of the unstable fluid by said hybrid polymer; and
storing the unstable fluid within said vessel for a period of time of at least about 1 hour, during which period of time there is reduced decomposition of the unstable fluid until the unstable fluid is ultimately dispensed from said vessel.

15. The method of claim 14 wherein said hybrid polymer is polymerized within said vessel prior to introduction of the unstable fluid.

16. The method of claim 14 wherein said hybrid polymer is polymerized prior to placement within said vessel.

17. The method of claim 14 wherein said hybrid polymer comprises metal-organic frameworks, coordination polymers, silicones, silsesquioxanes, ionic liquid polymers with metal containing anions or combinations thereof.

18. A method of stabilizing and purifying a fluid mixture comprising an unstable fluid and impurity, comprising:
providing a vessel;
providing a polymerized polymeric material within the vessel wherein said polymerized polymeric material is selected from the group consisting of inorganic polymers and hybrid polymers;
contacting the fluid mixture with said polymerized polymeric material;
allowing the impurity to be retained within the polymerized polymeric material to produce a purified unstable fluid wherein said purified unstable fluid is ultimately dispensed from said vessel by an end user separately from the impurity; and
storing the fluid mixture within the vessel for a period of time of at least about 1 hour, during which period of time there is reduced decomposition of the unstable fluid.

19. The method of claim 18 wherein said polymerized materials are polymerized within said vessel prior to introduction of the fluid mixture.

20. The method of claim 18 wherein said polymerized polymeric materials are polymerized prior to placement within said vessel.

21. The method of claim 18 wherein said inorganic polymers comprise, zeolites, clays, layered oxide materials, aluminophosphates, germanates, aluminosilicates, germanium phosphates, oxides, nitrides, metal halides, minerals, xerogels, aerogels, metal oxides and alloys derived from inorganic polymeric gels, sintered glass, other forms and types of generally non-organic materials or combinations thereof.

22. The method of claim 18 wherein said hybrid polymers comprise, metal-organic frameworks, coordination polymers, silicones, silsesquioxanes, ionic liquid polymers with metal containing anions or combinations thereof.

23. A method of storing, stabilizing, and purifying an unstable fluid mixture comprising an unstable fluid and the impurity, comprising:
providing a vessel;
providing a polymerized polymeric material within said vessel wherein said polymerized polymeric material is selected from the group consisting of inorganic polymers and hybrid polymers;
contacting the unstable fluid mixture with said polymerized polymeric material for take-up of the unstable fluid mixture by said polymerized polymeric material;
allowing the impurity to be retained within said polymerized polymeric material to produce a purified unstable fluid; and
storing the fluid mixture within said vessel for a period of time of at least about 1 hour, during which period of time there is reduced decomposition of the unstable fluid wherein said purified unstable fluid is ultimately dispensed from said vessel by an end user separately from the impurity.

24. The method of claim 23 wherein said polymerized polymeric materials are polymerized within said vessel prior to introduction of the fluid mixture.

25. The method of claim 23 wherein said polymerized polymeric materials are polymerized prior to placement within said vessel.

26. The method of claim 23 wherein said inorganic polymers comprise, zeolites, clays, layered oxide materials, aluminophosphates, germanates, aluminosilicates, germanium phosphates, oxides, nitrides, metal halides, minerals, xerogels, aerogels, metal oxides and alloys derived from inorganic polymeric gels, sintered glass, other forms and types of generally non-organic materials or combinations thereof.

27. The method of claim 23 wherein said hybrid polymers comprise, metal-organic frameworks, coordination polymers, silicones, silsesquioxanes, and ionic liquid polymers with metal containing anions.

* * * * *